(12) United States Patent
Williamson et al.

(10) Patent No.: US 8,190,637 B2
(45) Date of Patent: *May 29, 2012

(54) SYSTEM AND METHOD FOR COMPLEX DOCUMENT DRAFTING USING AN AUTHENTICATED OUTLINE TABLE

(75) Inventors: Mary L. Williamson, Seattle, WA (US); Martin F. Smith, Bainbridge Island, WA (US); David C. Hensler, Seattle, WA (US); Charles P. Hensler, Langley, WA (US); Amy C. Theobald, Seattle, WA (US)

(73) Assignee: FTI Technology LLC, Baltimore, MD (US)

( * ) Notice: Subject to any disclaimer, the term of this patent is extended or adjusted under 35 U.S.C. 154(b) by 493 days.

This patent is subject to a terminal disclaimer.

(21) Appl. No.: 12/391,179

(22) Filed: Feb. 23, 2009

(65) Prior Publication Data

US 2009/0210398 A1 Aug. 20, 2009

Related U.S. Application Data

(63) Continuation of application No. 11/486,487, filed on Jul. 14, 2006, now Pat. No. 7,496,577, which is a continuation of application No. 09/724,837, filed on Nov. 28, 2000, now Pat. No. 7,080,076.

(51) Int. Cl.
*G06F 7/00* (2006.01)
(52) U.S. Cl. ......... 707/783; 707/784; 707/785; 707/731
(58) Field of Classification Search ............. 707/706, 707/707, 708, 731, 783, 784, 785; 709/219
See application file for complete search history.

(56) References Cited

U.S. PATENT DOCUMENTS

| | | | | |
|---|---|---|---|---|
| 5,553,216 A | | 9/1996 | Yoshioka et al. | |
| 5,581,758 A | * | 12/1996 | Burnett et al. | 707/708 |
| 5,692,206 A | | 11/1997 | Shirley et al. | |
| 5,774,866 A | | 6/1998 | Horwitz et al. | |
| 5,864,871 A | * | 1/1999 | Kitain et al. | 707/708 |
| 5,940,843 A | * | 8/1999 | Zucknovich et al. | 715/210 |
| 6,067,531 A | | 5/2000 | Hoyt et al. | |
| 6,073,160 A | | 6/2000 | Grantham et al. | |
| 6,112,206 A | * | 8/2000 | Morris et al. | 707/708 |

(Continued)

OTHER PUBLICATIONS

Legalees Corporation, "The License Preparation System," printed catalog of legal document generating software, Jan. 2000, LegaLees Corporation, Provo, Utah.

(Continued)

*Primary Examiner* — Thuy Pardo
(74) *Attorney, Agent, or Firm* — Patrick J. S. Inouye; Krista A. Wittman

(57) ABSTRACT

A system and method for complex document drafting using an authenticated outline table is provided. A collection of outlines, user authorization lists, and preference lists are maintained. Identification information is received from a user. One of the user authorization lists and one of the preference lists are selected based on the identification information received. The outlines are compared to the user authorization list and those outlines for which the user is not authorized are filtered from use. The outlines are compared to the preference list and those outlines not preferred by the user are filtered from use. The non-filtered outlines are displayed to the user and at least one of the non-filtered outlines is selected based on a request from the user. The selected non-filtered outline is provided to the user in a document.

20 Claims, 13 Drawing Sheets

U.S. PATENT DOCUMENTS

| | | | |
|---|---|---|---|
| 6,202,066 | B1 | 3/2001 | Barkley et al. |
| 6,237,099 | B1 | 5/2001 | Kurokawa |
| 6,278,999 | B1 | 8/2001 | Knapp |
| 6,496,822 | B2 | 12/2002 | Rosenfelt et al. |
| 6,785,679 | B1 | 8/2004 | Dane et al. |
| 6,785,716 | B1 * | 8/2004 | Nobakht ............... 709/219 |
| 7,130,807 | B1 | 10/2006 | Mikurak |
| 7,418,397 | B2 | 8/2008 | Kojima et al. |
| 7,457,948 | B1 | 11/2008 | Bilicksa et al. |
| 2002/0095454 | A1 * | 7/2002 | Reed et al. ............ 709/201 |

OTHER PUBLICATIONS

Parsons Software, "Legal: Complete Legal Collection 2000," on-line catalog of legal document generating software, 2000, The Learning Company, Fremont, California.

Business Laws, Inc., "Model Agreements & Checklists on CD-ROM," brochure of legal document generating software, 2000, Business Laws, Inc. Chesterland, Ohio.

Business Laws, Inc., "Corporate Law," on-line catalog of legal document generating software, 2000, www.businesslaws.com/catalog.

Business Laws, Inc., "Legal Aspects of Employee Handbooks and Policies," brochure of legal document generating software, 2000, Business Laws, Inc. Chesterland, Ohio.

Business Laws, Inc., "Business Ethics Policies," brochure of legal document generating software, 2000, Business Laws, Inc. Chesterland, Ohio.

Lauritsen, Marc, "Automating Legal Documents: An Interview with David Brayshaw," ABA Law Practice Management Section, on-line magazine article, www.abanet.org, Aug.-Dec. 2000.

Sequoia Professional Development Corporation, "Software Licensing and Internet Agreements," brochure for workshop, 2000, Washington DC.

Richard Raysman et al., "Intellectual Property Licensing: Forms and Agreements," brochure of automated legal documents, Law Journal Press, 2000 New York, New York.

Clarke et al., "Verifying Security Protocols With Brutus," ACM, Oct. 2000, vol. 9, No. 4, pp. 443-487 (Oct. 2000).

Herrmann et al., "PIROL: A Case Study for Multidimensional Separation of Concerns in Software Engineering Environments," ACM, Oct. 2000, pp. 118-207 (Oct. 2000).

Rodriguez-Martinez et al., "MOCHA: A Self-Extensible Database Middleware System for Distributed Data Sources," ACM, Jun. 2000, pp. 213-224 (Jun. 2000).

* cited by examiner

SYSTEM AND METHOD FOR COMPLEX DOCUMENT DRAFTING USING AN AUTHENTICATED OUTLINE TABLE

CROSS-REFERENCE TO RELATED APPLICATIONS

This patent application is a continuation of U.S. application Ser. No. 11/486,487, filed Jul. 14, 2006, now U.S. Pat. No. 7,496,577, issued Feb. 24, 2009, which is a continuation of commonly-assigned U.S. patent application Ser. No. 09/724,837 filed Nov. 28, 2000, now U.S. Pat. No. 7,080,076, issued Jul. 18, 2006, the priority dates of which are claimed and the disclosures of which are incorporated by reference.

FIELD

The present invention relates in general to automated legal document drafting and, in particular, to a system and method for complex document drafting using an authenticated outline table.

BACKGROUND

Complex document drafting involves substantially more thought and effort than merely filling in blank lines. Rather, the process involves writing individual terms and clauses with highly particularized and often legal meanings. Those terms and clauses are then assembled into structured documents.

Generally, such structured documents are in the form of legally binding contracts. Contracts, unlike ordinary documents, have a legal effect on the rights of the signing parties and possibly third parties. Consequently, contracts, as well as any other type of legal document affecting individual rights, can be drafted only by experienced professionals.

Drafting competent documents is difficult, especially where the documents have a significant legal impact. Moreover, document draftsmanship depends in large part on the knowledge and experience of the writer. A capable draftsperson will take into account numerous factors in crafting a document, including, for instance, the nature and scope of the subject matter, the characteristics and relative positions of the parties, customary practices in the field, required language, language used in prior dealings, enforceability of terms and conditions, and jurisdictional and choice of law considerations, to name a few.

Document drafting is not easily taught and can be a time consuming process for a novice writer. The stricture of and individual clauses from previously drafted documents can be followed to save time and learn by example. However, every document requires individualized analysis and planning. In addition, old documents, taken in isolation, lack the insight and wisdom imparted by their author during the drafting process.

In a legal setting, teams of attorneys often cooperatively service the document drafting needs of a single client for cost and time efficiency. Some clients require standardized language and consistency becomes a concern. Individual work products can reflect variations in style, skill, and experience level. A sense of consistency, and possibly legal effect, can be lost due to these variations. Moreover, maintaining control over the countless variations in work product poses a major challenge to the attorney responsible to the client.

In the prior art, templates combined with word processing programs provide limited automated document drafting capabilities. Templates enable users to create a table of shareable skeletal boilerplates. Each template can be populated with clauses and specific content based on user selections and pre-defined merge codes, thereby allowing a moderate level of customizability. Nevertheless, document templates provide virtually no writer education and operate at a document level with limited clause and term customizability. Moreover, templates do not provide integrated means for accessing external resource materials.

Similarly, many prior art document generation programs automatically draft documents based on user inputs. An example is the Complete Legal Collection 2001 product, licensed by Parsons Software, a division of Mattel Interactive, Inc., Fremont, Calif. Although able to create customized documents, such programs are typically bundled with a table of generic contract templates that draw on commonly encountered problems. These types of programs draft documents using a generic question and answer format and often fail to fully address the specific needs of a given situation or set of parties. Additionally, the clause or terminology tables are static. These tables cannot store party-specific clauses or to be controlled by an author responsible for ensuring consistency and proper application.

Finally, a prior art contract negotiation and generation system and method is described in U.S. Pat. No. 6,067,531 ('531) to Hoyt et al. A shareable contract database stores contracts with multiple contract components. Several different classes of users can access the contracts, based on their class membership and subject to contract status codes. A contract can be generated for a customer with the user's company participating as a contracting party. The users access the contract components via an applet executing on a client system. The applet facilitates user input and assists in the standardization of legal phrasing and contract negotiation. However, the '531 device does not filter the contracts based on contracting parties. Nor does the '531 device include fine-grained authorization and preference controls to restrict access to individual contract clauses and terms based on the identity of the user or one or more of the parties. Moreover, as the user is itself a party to the contract, contracting terms are inherently pre-disposed to one party's contracting position and ethical "walls" cannot be created to shield individual users from viewing contracts relating to conflicted parties. Finally, the applet is a "zero-footprint" application that must be downloaded onto the client system prior to execution and requires a client-based interpreter.

Therefore, there is a need for an automated approach to drafting complex documents, particularly contracts, capable of imparting expert knowledge to the drafting process independent of the user. Preferably, such an approach would provide a fine-grained authenticated table for storing and retrieving customizable outlines, clauses and terms based on the user and parties. The authentication would ensure control over content and promote consistency in presentation and usage. Such an approach would also be coupled to a comprehensive system of annotations for educational and reference resources.

SUMMARY

The present invention provides an automated system and method for drafting complex documents, particularly contracts, using an authenticated collection of clauses, outlines, and drafting-related resources. Tables of clauses, standard and non-standard document outlines, and topic lessons are maintained in a database. Indices of the tables are generated. A list of authorizations controlling modification and access to the tables is created. A list of preferences for document content and structure is also created. Clauses, outlines, and topic lessons are selected from the tables filtered by the authorizations and populated based on the preferences of the parties potentially affected by the document and the monetary value of the agreement. Selections of clauses and outlines can be tracked in a journal for auditing and follow up.

An embodiment provides a system and method for facilitating complex document drafting with authenticated clause selection. A database including a table of individual clauses is maintained. Each individual clause includes provisions and terms relating to one or more potentially affected parties. A list of authorizations is stored into the database. Each authorization controls clause modification and usage by users for each individual clause. A list of preferences is stored into the database. Each preference, and potentially the specified monetary amount of the transaction, influences clause selection for each individual party. Each selection of an individual clause from the individual clauses table is authenticated against the authorizations list for a given user and the preferences list for the given user and the potentially affected parties.

A further embodiment provides a system and method for complex document drafting using an authenticated outline table. A collection of outlines, user authorization lists, and preference lists are maintained. Identification information is received from a user. One of the user authorization lists and one of the preference lists are selected based on the identification information received. The outlines are compared to the user authorization list and those outlines for which the user is not authorized are filtered from use. The outlines are compared to the preference list and those outlines not preferred by the user are filtered from use. The non-filtered outlines are displayed to the user and at least one of the non-filtered outlines is selected based on a request from the user. The selected non-filtered outline is provided to the user in a document.

The present invention promotes efficient document drafting for all skill levels. Annotations and links to educational and reference resources enable users to learn and utilize source materials integral to the drafting process.

Moreover, the table promotes uniformity of treatment and protections by ensuring that each document is consistent with other documents generated using the invention. As well, a practice group, including a law practice, can adopt a consistent "look and feel" to their work products by controlling the content of the table.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
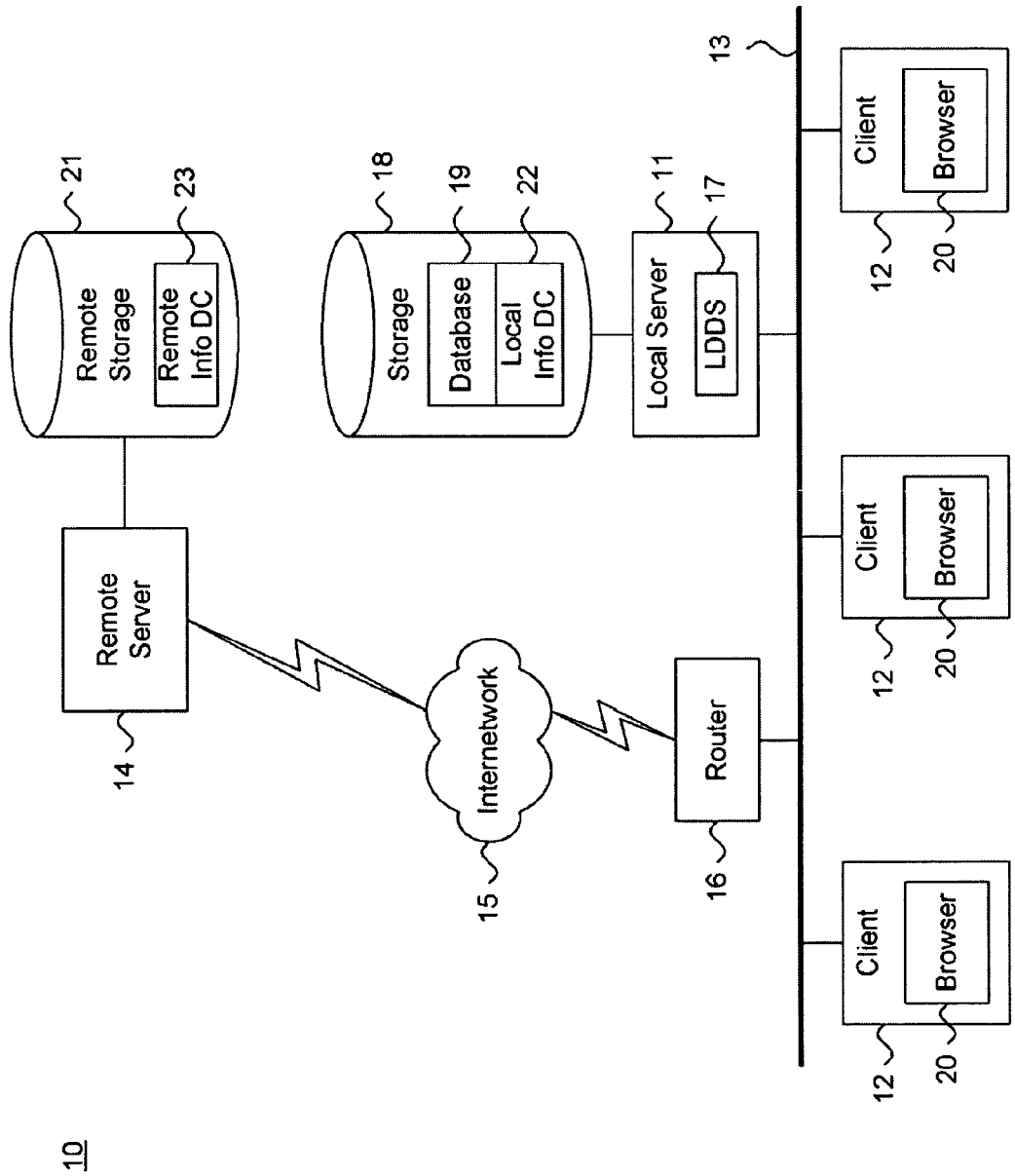
FIG. 1 is a block diagram showing a networked computing environment, including a system for efficiently drafting a legal document using an authenticated clause table, in accordance with the present invention.

FIG. 1 is a block diagram showing a networked computing environment 10, including a system for efficiently drafting a legal document using an authenticated clause table, in accordance with the present invention. The system 10 consists of a local server 11 operating on a host computer system.

The local server 11 executes a legal document drafting system 17 (LDDS), as further described below with reference to FIG. 2. The local server 11 provides access to a shareable database 19 maintained on an attached storage device 18 to a plurality of clients 12. The database could be distributed or structured in any similar shareable fashion.

Each client 12 executes a browser 20, which provides a user interface into the LDDS 17 and local application functionality. Other forms of user interface, including dedicated application programs, are feasible. The clients 11 are interconnected to the local server 11 via an intranetwork 13 that is itself interconnected to the internetwork 15 via a router 16 or similar device. The internetwork includes public internetworks, such as the Internet, that allows interconnection to hosts and users worldwide The LDDS 17 provides an automated approach to drafting complex documents, particularly contracts and similar forms of legal document. The LDDS 17 references a set of authenticated tables in the database 19, as further described below with reference to FIG. 3, storing customizable outlines, clauses and terms, and educational and reference topics. These tables are indexed for efficient, fine-grained retrieval and access to individual data items is controlled and subject to user and party authentication and preferences.

Annotations can be associated with the outlines, clauses and terms. As well, the annotations can include hyperlinks to local and external reference resources. The local reference resources are retrieved via the local server 11 from a local information data collection (DC) 22 maintained on the local storage 18. Similarly, the external reference resources are retrieved via a remote server 14 that provides access to a remote information data collection 23 maintained on a remote storage 21. The remote server 14 is interconnected to the LDDS 17 via the internetwork 15. The topics and annotations associated with the outlines, clauses and terms enable the LDDS 17 to impart expert knowledge to the document drafting process independent of the skill and experience level of the user. Other types of clients, network topologies and configurations, and forms of interconnection are feasible.

The individual computer systems, including the local server 11, remote server 14, and clients 12, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
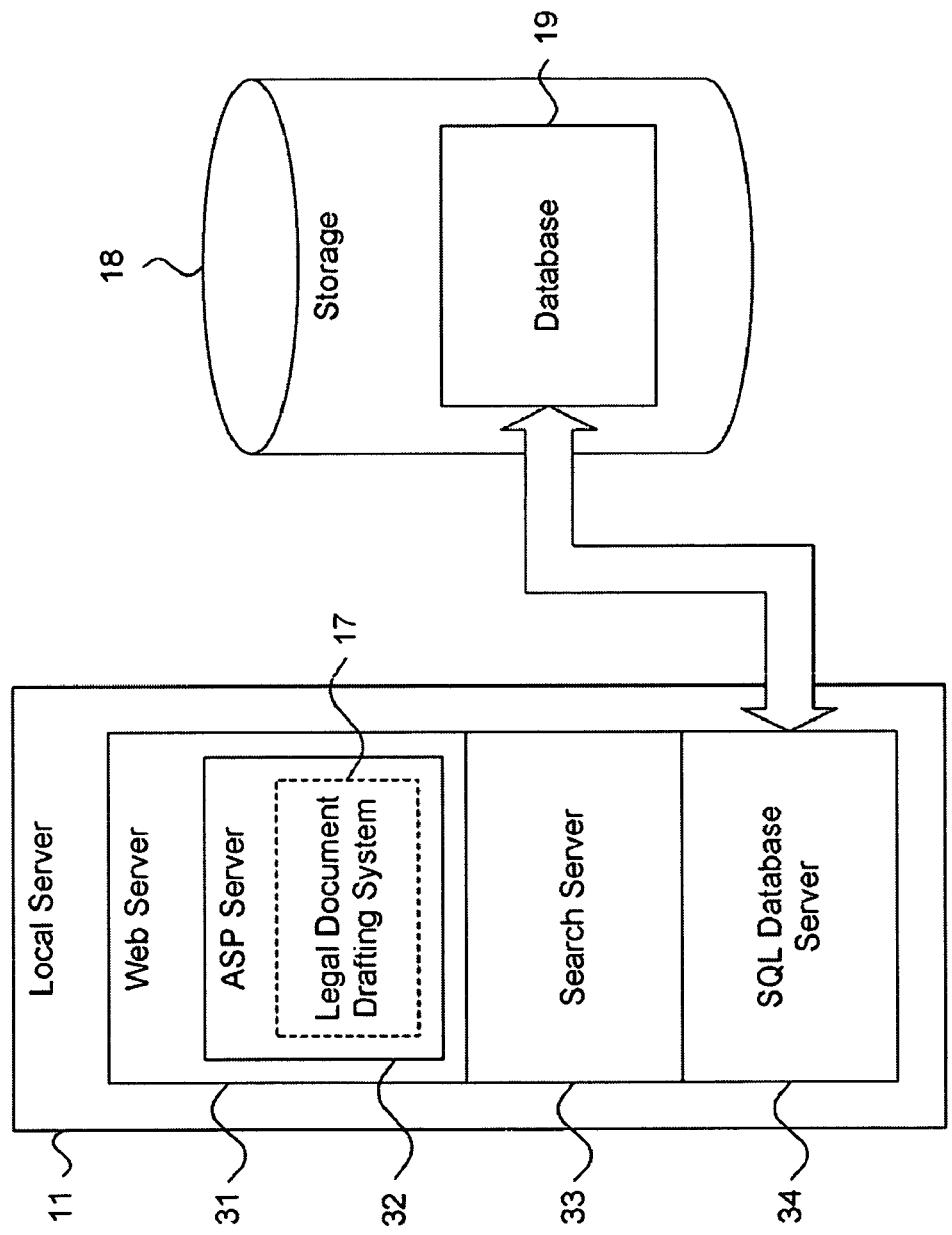
FIG. 2 is a detail block diagram showing the system for efficiently drafting a legal document of FIG. 1.

FIG. 2 is a detail block diagram showing the system for efficiently drafting a legal document 17 of FIG. 1. The LDDS 17 executes on the local server 11 as an active server page (ASP) application. The LDDS 17 is browser-based and is retrieved as part of a set of interactive Web pages (not shown) by browsers 20 (shown in FIG. 1) executing on requesting clients 12. To support the LDDS 17, the local server 11 executes a Web server 31, active server page (ASP) server 32, search server 33, and structured query language (SQL) database server 34.

The Web server 31 serves the Web pages defining the LDDS 17 to the browsers 20. The Web pages are written as scripts in an interpretable, tag-delimited language, such as the Hypertext Markup Language (HTML), which is used in the described embodiment, and the Extensible Markup Language (XML), although other interpretable tag-delimited languages could be used. Upon receipt, the browsers 20 interpret the script to display the requested content.

The LDDS 17 is functionally defined at execution time as a series of active server pages interpreted by the ASP server 32. Like a browser 20, the ASP server 32 interprets executable scripts, known as Active Server Pages, embedded within the Web pages. In the described embodiment, the Active Server Page technology, licensed by Microsoft Corporation, Redmond, Wash., is used whereby compiled VBScript COM objects are encapsulated within ASP wrappers. Executable objects are preferably utilized for processing efficiency. Upon execution, the Active Server Pages are converted into ordinary Web pages, typically written in HTML or XML. The Active Server Pages are written as VBScripts, which are described in A. K. Weissinger, "ASP in a Nutshell, A Desktop Quick Reference," chs. 1-3, O'Reilly & Assocs. (1999), the disclosure of which is incorporated by reference.

In addition, the tables of outlines, clauses and terms are maintained in the database 19 via the SQL database server 34. For efficiency, the tables are indexed accessed via the search server 33, which works in conjunction with the SQL database server 34. In the described embodiment, the SQL database server 34 and database 19 form a relational database management system RDBMS, such as the Oracle 8i product, licensed by Oracle Corporation, Redwood Shores, Calif. The search server is implemented using the Microsoft Search Services product, but could also be logically integrated as part of the RDBMS.

Figure 3:
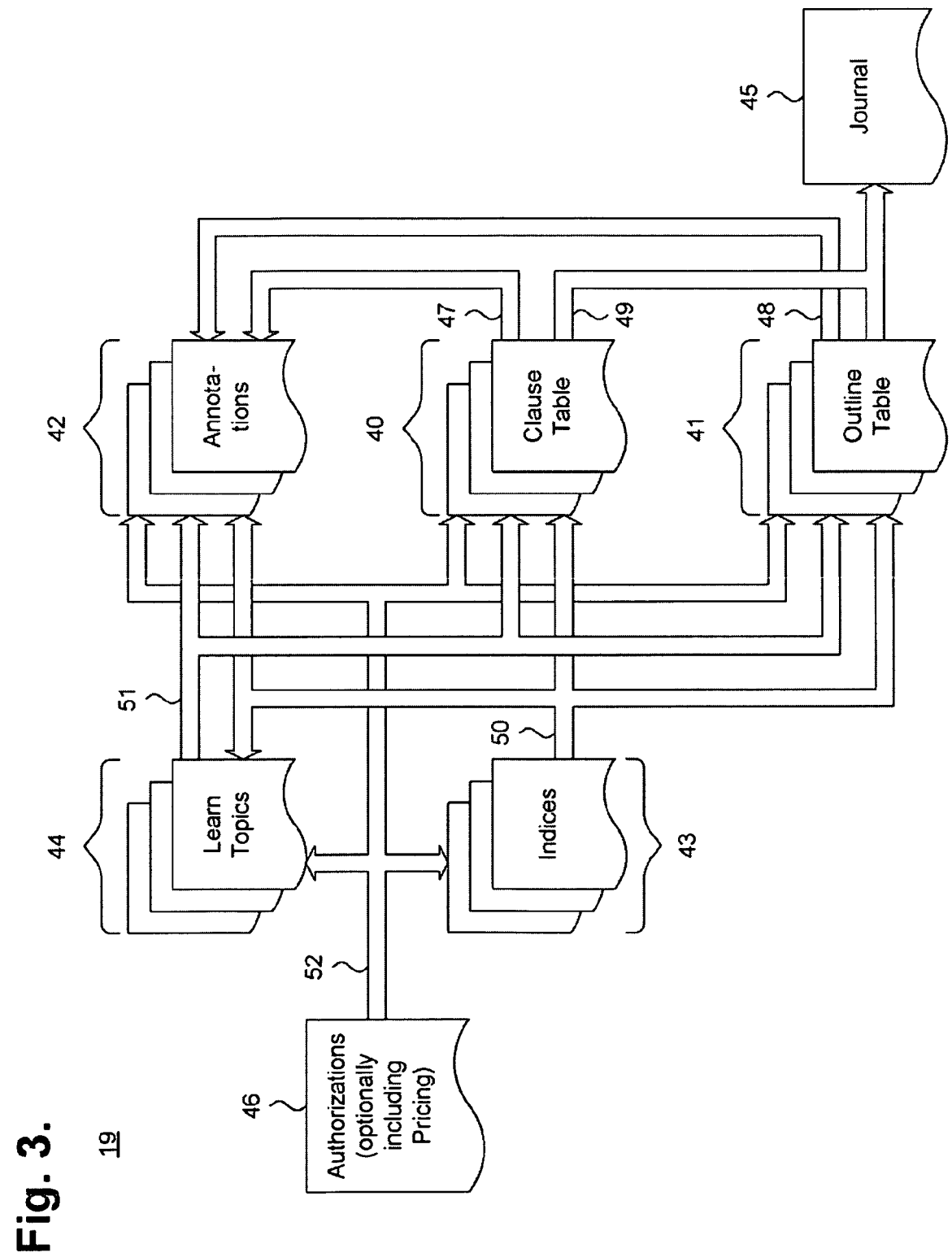
FIG. 3 is a functional block diagram showing the structure of the database of FIG. 1.

FIG. 3 is a functional block diagram showing the structure of the database 19 of FIG. 1. The database 19 is relationally organized into a logical set of tables, lists, and indices, which are related through table links. There are four logical tables: clause table 40, outline table 41, annotations 42, and learn topics 44. In the described embodiment, the logical tables are maintained in a single, hierarchically structured table with parent/child relationships formed via a cross-reference table (not shown). The structured table stores the indices to the clauses, outlines, annotations, learn topics, and options within the outlines. Unlike traditional table generation performed through join operations, this schema allows multiple layers of relationships. However, other organizational schemas and data structures are also possible.

The clause table 40 contains a collection of paragraphs and sentences which each define provisions and terms relating to one or more parties potentially affected by a use of the clause in a legal document. The clauses could also present legally neutral language, such as standard definitions and explanations. The clauses include pre-defined fields into which the individual parties can be automatically inserted, as well as blank fields into which customized language can be added.

The outline table 41 contains a collection of two types of outlines. Standard outlines create an organizational framework into which the clauses from the clauses table 40 can be inserted in a structured order to form a legal document or similar writing. Non-standard outlines similarly create an organizational framework but are free format and do not impose a structured order. The outlines can include sections of standard "boilerplate" language. As well, the outlines are populated with clauses selected from the clauses table 40 and can include optional sections in which the writer is prompted to chose between different heading areas.

The annotations 42 provide explanatory descriptions of individual clauses, outlines, and outline subsections. The clauses in the clause table 40 form associations 47 with annotations, as appropriate. Similarly, the outlines in the outline table 41 form associations 48 with annotations, as appropriate. The annotations are automatically displayed upon the selection of a clause or outline. Each annotation can include an embedded hyperlink referencing information stored locally in the local information data collection 22 (shown in FIG. 1) or remotely in the remote information data collection 23. The hyperlinks allow the annotation to be augmented with a more detailed explanation or educational or reference materials.

The learn topics 44 provide a topical description of the clauses and outlines, as well as other topics relating to complex document drafting. The topics in the learn topics 44 form associations 51 with annotations, clauses, and outlines, as appropriate. In addition, each topic can include an embedded hyperlink referencing a data source local or external to the database 19.

To improve efficiency of retrieval and ease of use, the tables 40-42 and learn topics 44 are indexed by indices 43. Each index forms an association 50 with the learn topics, annotations, clauses, and outlines, preferably using a topical ordering based on the subject matter addressed by the learn topic, annotation, clause, or outline.

A list of authorizations list 46 control the modification and use of the various component tables and indices based on the identity of the user or parties to the contract and, optionally, on the price of a service or item identified in the contract. The authorizations list 46 forms an association with the learn topics, indices, annotations, clauses, and outlines. Only authorized users, such as the client responsible attorney in a law firm setting, are allowed to modify the associated component tables or indices. Similarly, only authorized users are allowed to use the associated tables or indices. If pricing information is included in the authorizations list 46, clause and outline selections are filtered based on their associated permissible dollar or monetary value. The authorizations list 46 provides affirmative control and creates a means for promoting uniform and consistent document drafting. As well, this list prevents unauthorized or unintentional use of the component tables and indices, thereby enabling the creation of "ethical walls" in a law firm setting.

Preferably, the use of the individual clauses and outlines in completed legal documents is tracked by a journal 45. Both the clause table 40 and outline table 41 form an association 49 with the journal 45 which records each clause and outline use upon the generation of a completed complex document. The journal 45 creates an audit trail that can later be useful for notifying clients of factors that might later impact the complex documents to which they are a party.

Other database types, structures, schemas, and organizations are possible.

Figure 4:
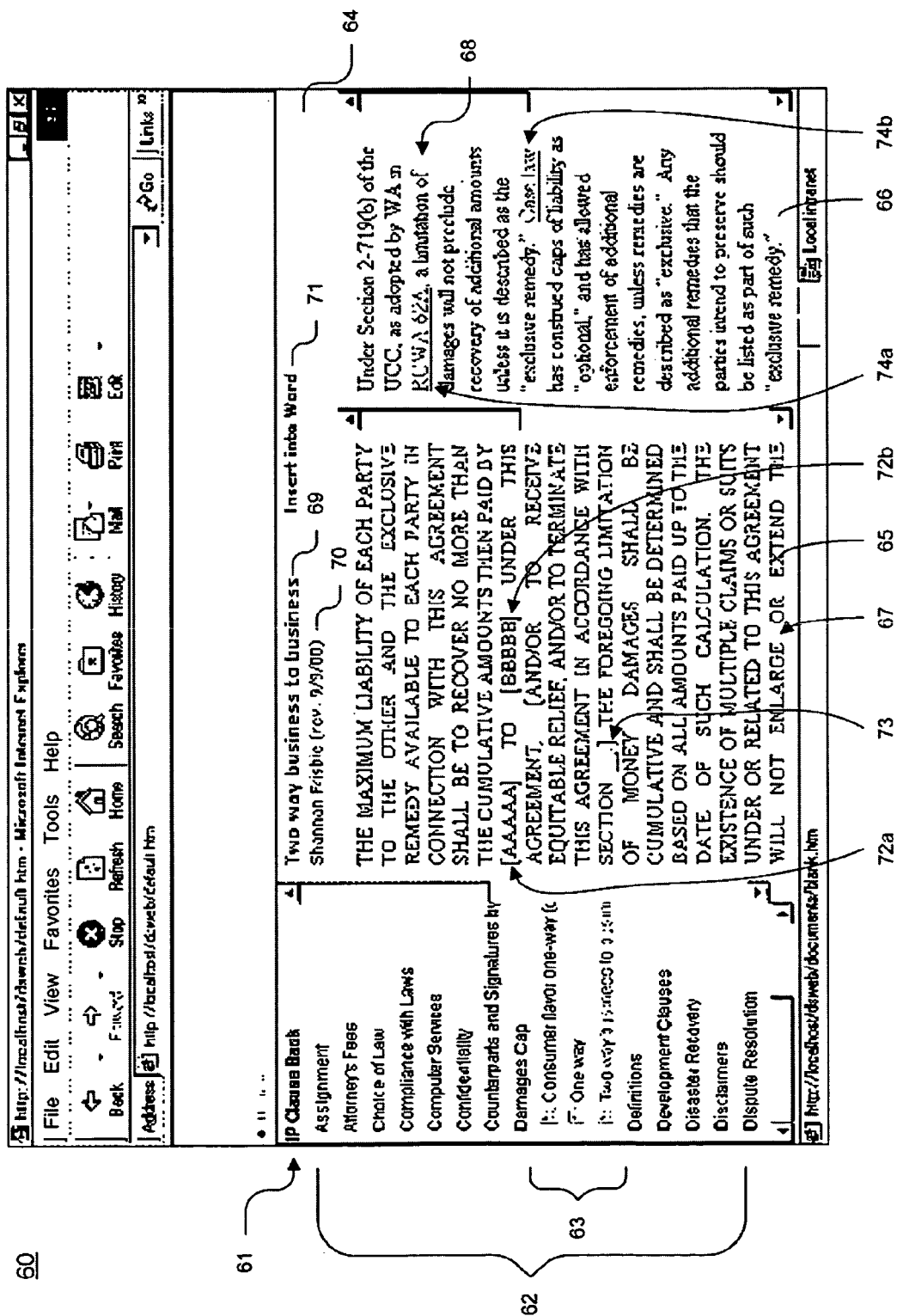
FIG. 4 is a screen shot showing, by way of example, a menu-driven clause selection module with annotations and hyperlinks.

FIG. 4 is a screen shot showing, by way of example, a menu-driven clause selection module 60 with annotations 68 and hyperlinks 74*a-b*. This module is used to select individual clauses. The clause selection module 60 exports a user interface with document drafting controls. The clause selection module 60 presents a topic heading 61 and a topic listing, divided into general topics 62 and specific topics 63 from which a user can select a particular clause.

The remainder of the clause selection module 60 includes a title panel 64, clause panel 65, and an annotation panel 66. The title panel 64 identifies the clause title 69 and indicates the author and revision date 70. The selected clause (without any associated annotation) can be inserted directly into a document via a word processing program interface 71. In the described embodiment, a selected clause is inserted into a document created using the Word program, licensed by Microsoft Corporation, Redmond, Wash., although other word processing programs could also be used.

Each selected clause 67 is displayed is the clause panel 65 upon successful authentication. Prior to display, the LDDS 17 determines whether the user is authorized to use the selected clause 67 based on the authorizations list 46 (shown in FIG. 3). Similarly, the LDDS 17 filters the topic listing to those clauses preferred by the one or more of the parties potentially affected by the clause. The clause 67 optionally includes the names of one or more of the potentially affected parties 72*a-b* and blank fields 73 into which further data can later be added.

Finally, the annotations panel 66 displays the annotation 68 associated with the selected clause 67: The annotation 68 can include one or more hyperlinks 74*a-b* linking the annotation to local or external data sources.

Figure 5:
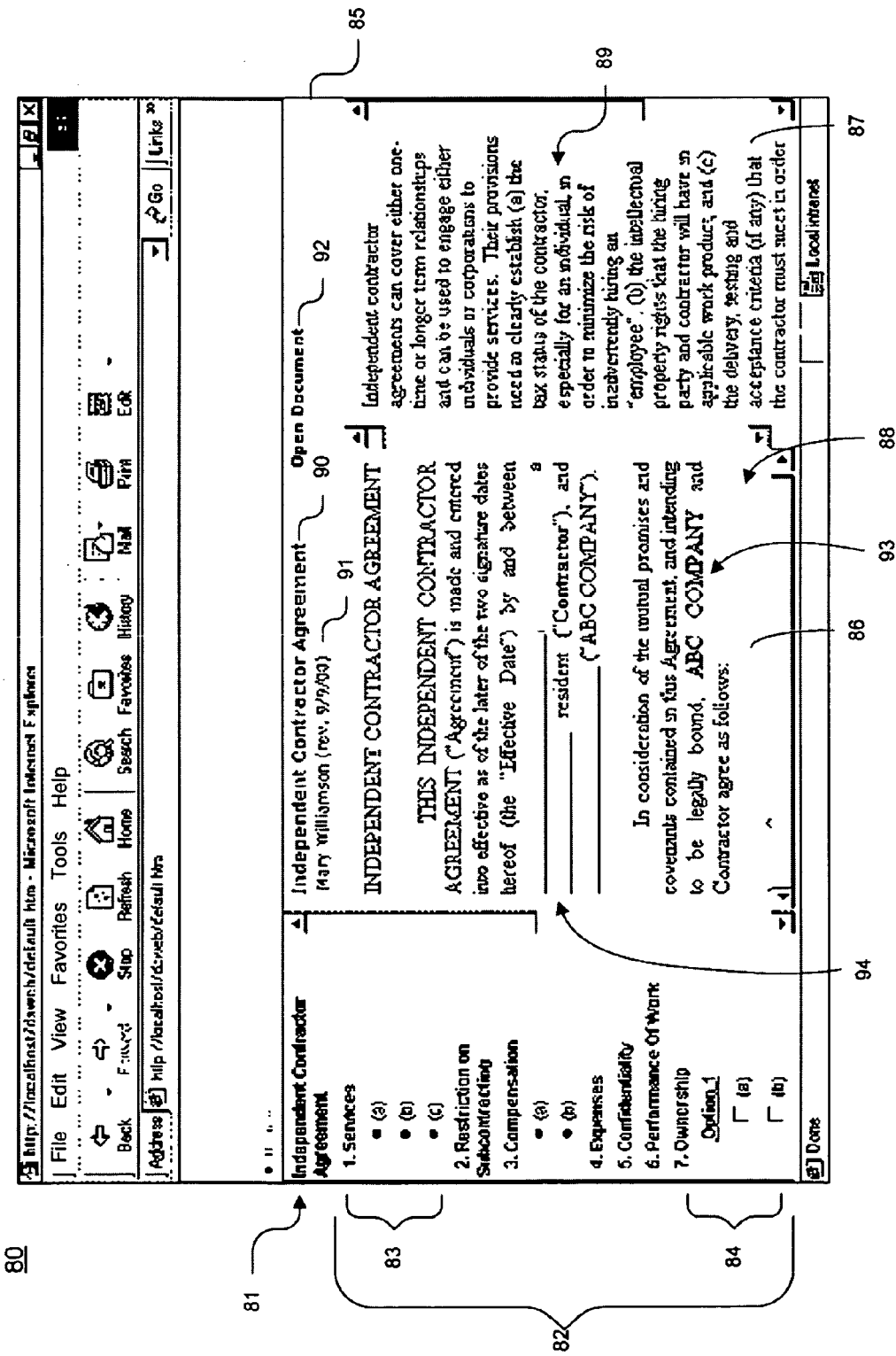
FIG. 5 is a screen shot showing, by way of example, a menu-driven outline selection module with annotations.

FIG. 5 is a screen shot showing, by way of example, a menu-driven outline selection module 80 with annotations 89. This module is used to select standard outlines for generating a complete document. The outline selection module 80 also exports a user interface with document drafting controls and presents a topic heading 81 and a topic listing. The topic listing is divided into general topics 82, specific topics 83, and optional topics 84. Individual clauses are selected to populate the various specific and optional topic sections.

Like the clause selection module 60, the remainder of the outline selection module 80 includes a title panel 85, outline panel 86, and an annotation panel 87. The title panel 85 identifies the outline title 90 and indicates the author and revision date 91. The selected outline can be inserted directly into a document via a word processing program interface 92.

Each selected outline 88 is displayed in the outline panel 86 upon successful authentication. Prior to display, the LDDS 17 determines whether the user is authorized to use the selected outline 88 based on the authorizations list 46 (shown in FIG. 3). Similarly, the LDDS 17 filters the topic listing to those outlines preferred by the one or more of the parties potentially affected by the outline. The outline 88 optionally includes the names of one or more of the potentially affected parties 93 and blank fields 94 into which further data can later be added.

Finally, the annotations panel 87 displays the annotation 89 associated with the selected outline 88. The annotation 89 can include one or more hyperlinks linking the annotation to local or external data sources.

Figure 6:
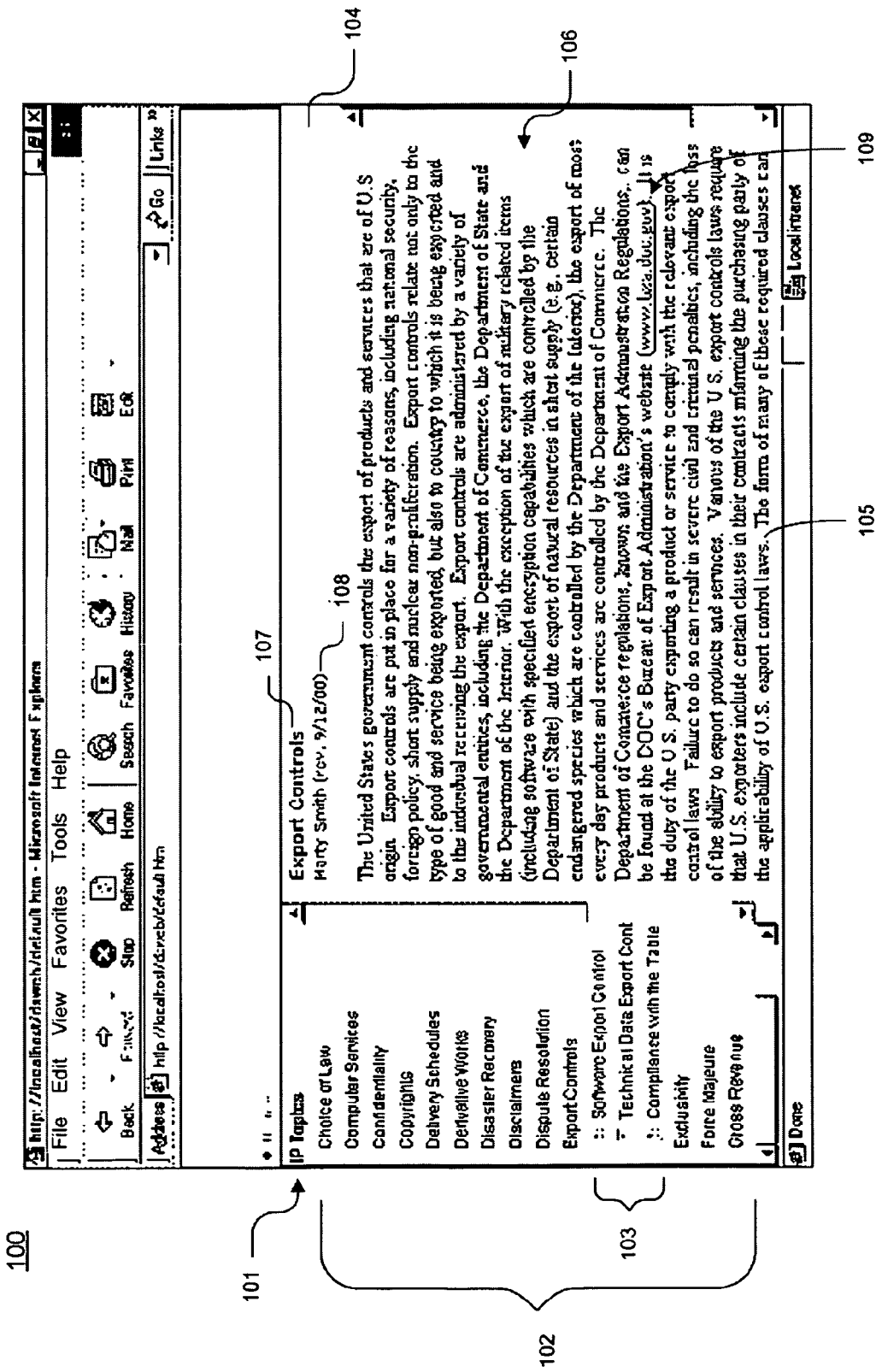
FIG. 6 is a screen shot showing, by way of example, a menu-driven learning module with annotations and hyperlinks.

FIG. 6 is a screen shot showing, by way of example, a menu-driven learning module 100 with annotations 106 and hyperlinks 109. This module is used to view topics relating to various aspects of complex document drafting. The learning module 100 exports a user interface with topic viewing controls. The learning module 100 presents a topic heading 101 and a topic listing, divided into general topics 102 and specific topics 103 from which a user can select a particular topic for review.

The remainder of the learning module 100 includes a title panel 104 and topic panel 105. The title panel 104 identifies the topic title 107 and indicates the author and revision date 108.

Each selected topic 106 is displayed in the topic panel 105 upon successful authentication. Prior to display, the LDDS 17 determines whether the user is authorized to review the selected topic 106 based on the authorizations list 46 (shown in FIG. 3). The selected topic 106 can include one or more hyperlinks 109 linking the annotation to local or external data sources.

Figure 7:
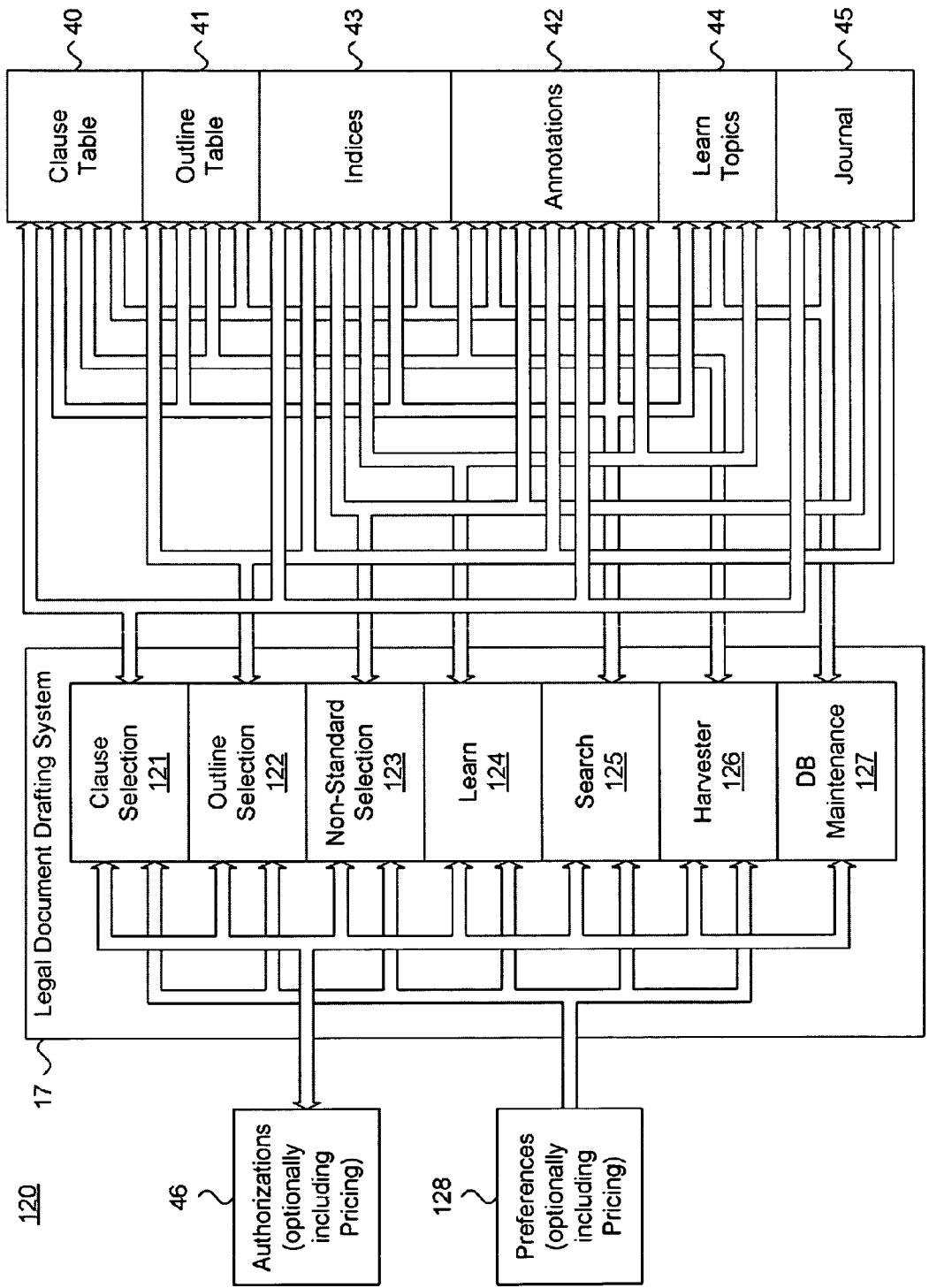
FIG. 7 is a block diagram showing the software modules of the system for efficiently drafting a legal document of FIG. 1.

FIG. 7 is a block diagram showing the software modules 120 of the system for efficiently drafting a legal document 17 of FIG. 1. Each module is a computer program, procedure or module written as source code in a conventional programming language, such as the Visual Basic programming language, and is presented for execution by the CPU as object or byte code, as is known in the art. The various implementations of the source code and object and byte codes can be held on a computer-readable storage medium or embodied on a transmission medium in a carrier wave. The system 17 operates in accordance with a sequence of process steps, as further described below beginning with reference to FIG. 8.

The LDDS 17 includes seven main modules: clause selection 121, outline selection 122, non-standard selection 123, learn 124, search 125, harvester 126 and database (DB) maintenance 127. Upon proper user authentication, the clause selection module 121 presents a topic listing using an index from the indices 43 and enables a user to select a clause from the clause table 40 based on the authorizations list 46 and preferences 128 in effect. Like the authorizations list 46, the preferences 128 can optionally include pricing information pertaining to goods or services identified in the contract. The clause selection module 121 references the indices 43, annotations 42, and preferences 128 and records the final selection of a clause into the journal 45 based on the authorizations list 46 and preferences 128, including any optional pricing information.

Similarly, the outline selection module 122 and non-standard outline module 123 both present a topic listing using an index from the indices 43 and enable a user to select an outline from the outline table 41 based on the authorizations list 46 and preferences 128 (outline selection module 122 only) in effect, including any optional pricing information. The outline selection module 122 and non-standard outline module 123 reference the indices 43, annotations 42, and preferences 128 and record the final selection of an outline into the journal 45 based on the authorizations list 46 and preferences 128, including any optional pricing information.

The learn module 124 presents a topic listing using an index from the indices 43 and displays a topic from the learn topics 44 based on the authorizations list 46 and preferences 128 in effect.

The remaining modules are primarily support tools provided to assist a user in using the LDDS 17. The search module 125 allows a user to search the clause table 40, outline table 41, annotations 42, indices 43, and learn topics 44. The harvester 126 allows an authorized user, based on the authorizations list 46 in effect, to insert new clauses, outlines, and annotations obtained from other sources into their respective tables. Finally, the database (DB) maintenance module 127 allows an authorized user, again based on the authorizations list 46 in effect, to manually maintain the various tables, indices, and lists.

Other modules are also possible. For instance, a pricing selection module could be incorporated to present an index of prices and to enable a user to select specified prices by dollar or monetary value for services or items identified in the document (or of the document itself).

Figure 8:
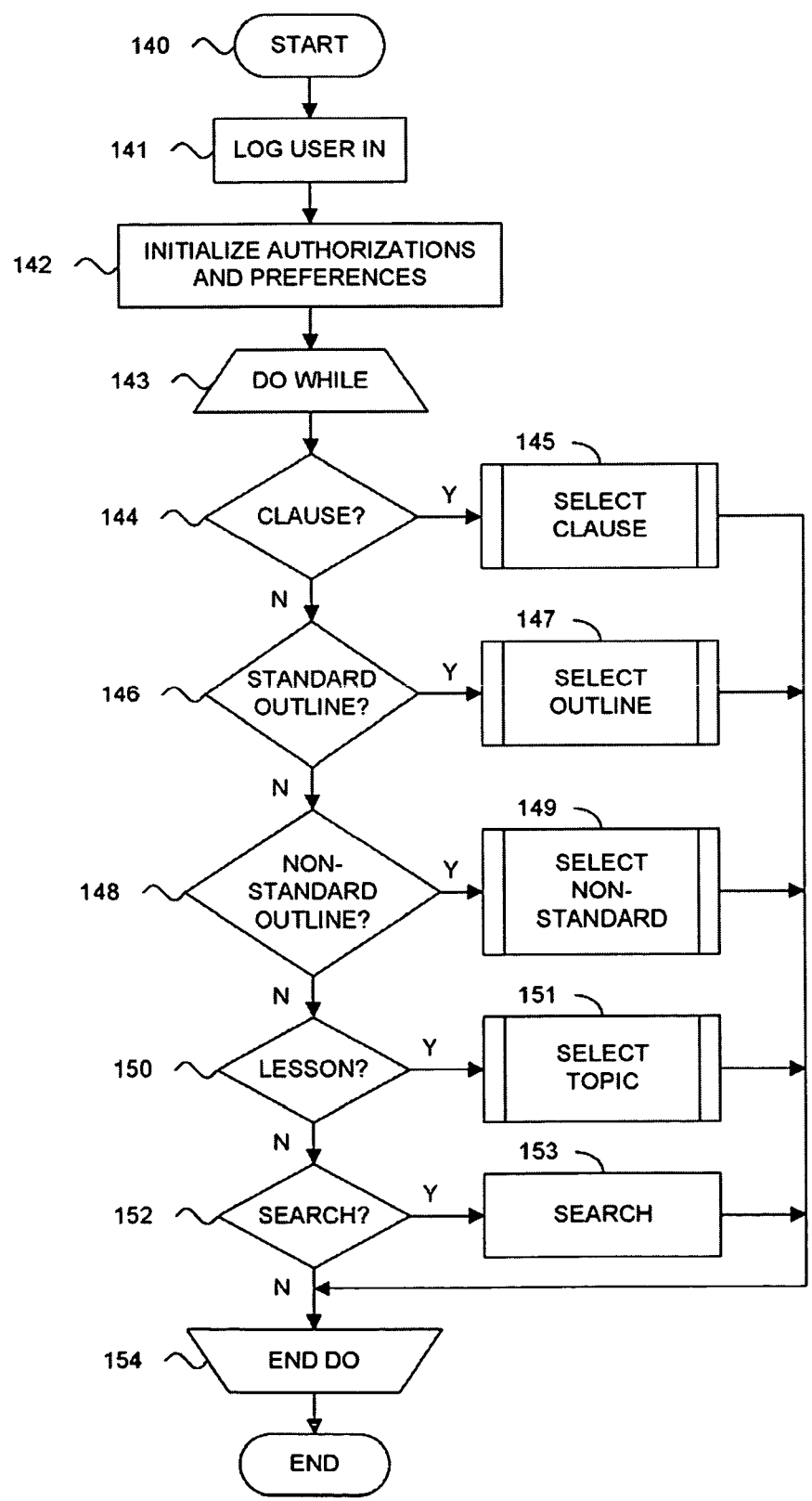
FIG. 8 is a flow diagram showing a method for efficiently drafting a legal document using an authenticated clause table in accordance with the present invention.

FIG. 8 is a flow diagram showing a method for efficiently drafting a legal document 140 using an authenticated clause table in accordance with the present invention. The method 140 operates in two phases: initialization (blocks 141-142) and processing (blocks 143-154). During initialization, the user logs into the LDDS 17 (block 141) identifies the parties potentially effected by the complex document to be drafted, and provides other ministerial information. The authorizations list 46 and preferences 128 are initialized (block 142) based on the user-provided identification information.

Processing (blocks 143-154) occurs in an iterative loop or similar control structure. During each iteration, user requests are processed and an appropriate routine is called based on the request type. A clause selection routine is called (block 145), as further described below with reference to FIG. 9, if a clause is requested (block 144). A outline selection routine is called (block 147), as further described below with reference to FIG. 10, if a standard outline is requested (block 146). A non-standard outline selection routine is called (block 149), as further described below with reference to FIG. 11, if a non-standard outline is requested (block 148). A learn topic routine is called (block 151), as further described below with reference to FIG. 12, if a lesson is requested (block 150). Finally, a search routine is called (block 153) if a search is requested (block 153). Processing continues until the program is terminated.

Figure 9:
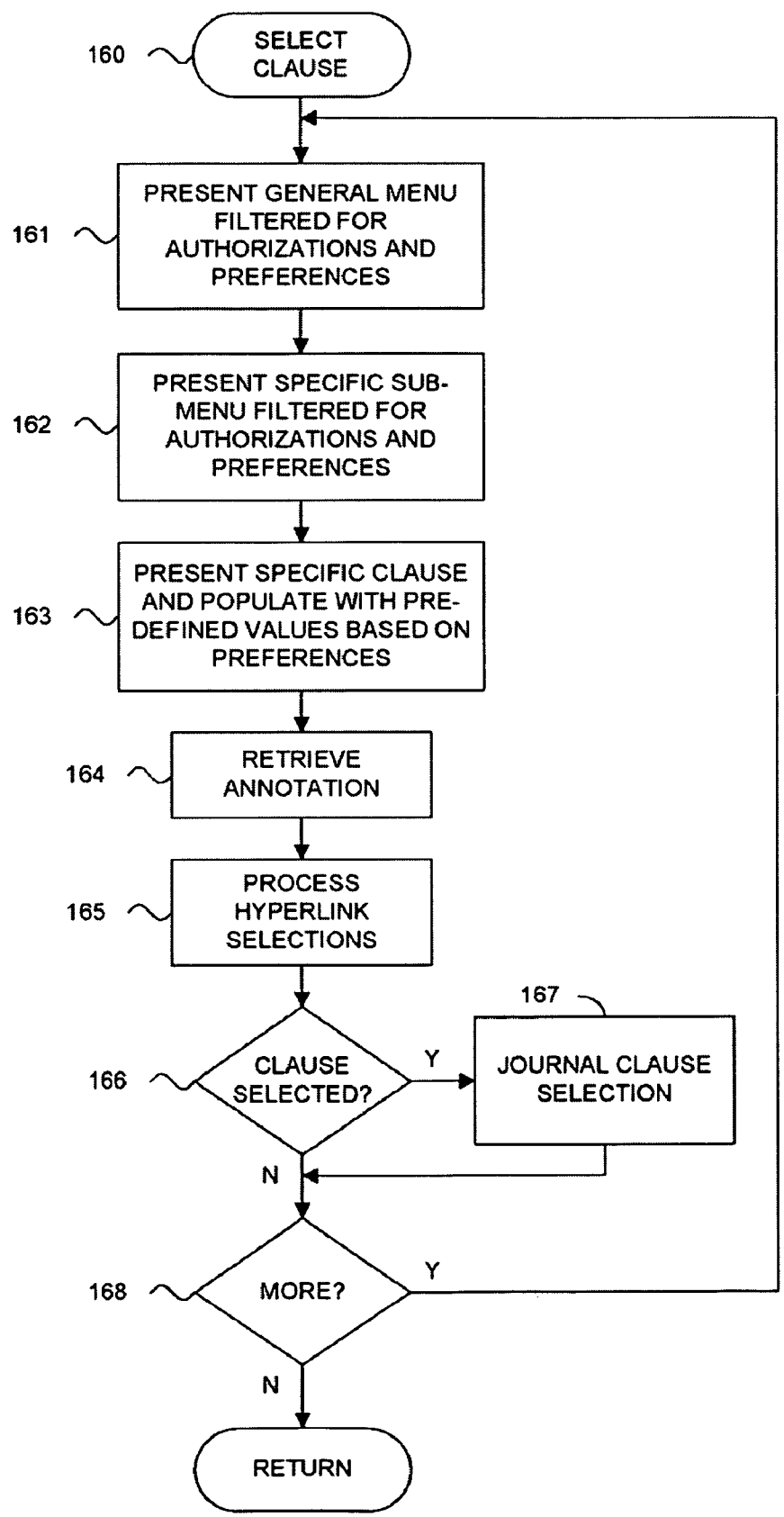
FIG. 9 is a flow diagram showing a routine for selecting a clause for use in the method of FIG. 8.

FIG. 9 is a flow diagram showing a routine for selecting a clause 160 for use in the method of FIG. 8. The purpose of this routine is to present a set of clause selection menus, clauses and annotations. Using the indices 43, a general menu of clauses is presented (block 161), filtered based on the authorizations list 46 for the user and populated with values based on the preferences 128 for the given user and the potentially affected parties. The authorizations list 46 and preferences 128 can optionally include pricing information which further filter the general clauses menu. Upon user input, a specific submenu of particular clause types, using the indices 43, is presented (block 162), again filtered based on authorizations list 46 and preferences 128 and any optional pricing information. Upon user input, a clause is retrieved from the clause table 40 and presented (block 163). The clause is populated with pre-defined values, such as names of potentially affected parties and similar information, based on the preferences 128 and any optional pricing information. If associated, an annotation is retrieved from the annotations 42 (block 164), subject to the authorizations list 46 for the user, and any hyperlink selections are processed (block 165). Finally, if the clause is selected for use in the actual complex document (block 166), the clause selection is recorded in the journal 45 (block 167). Clause selection continues until no further clauses are selected (block 168), after which the routine returns.

Figure 10:
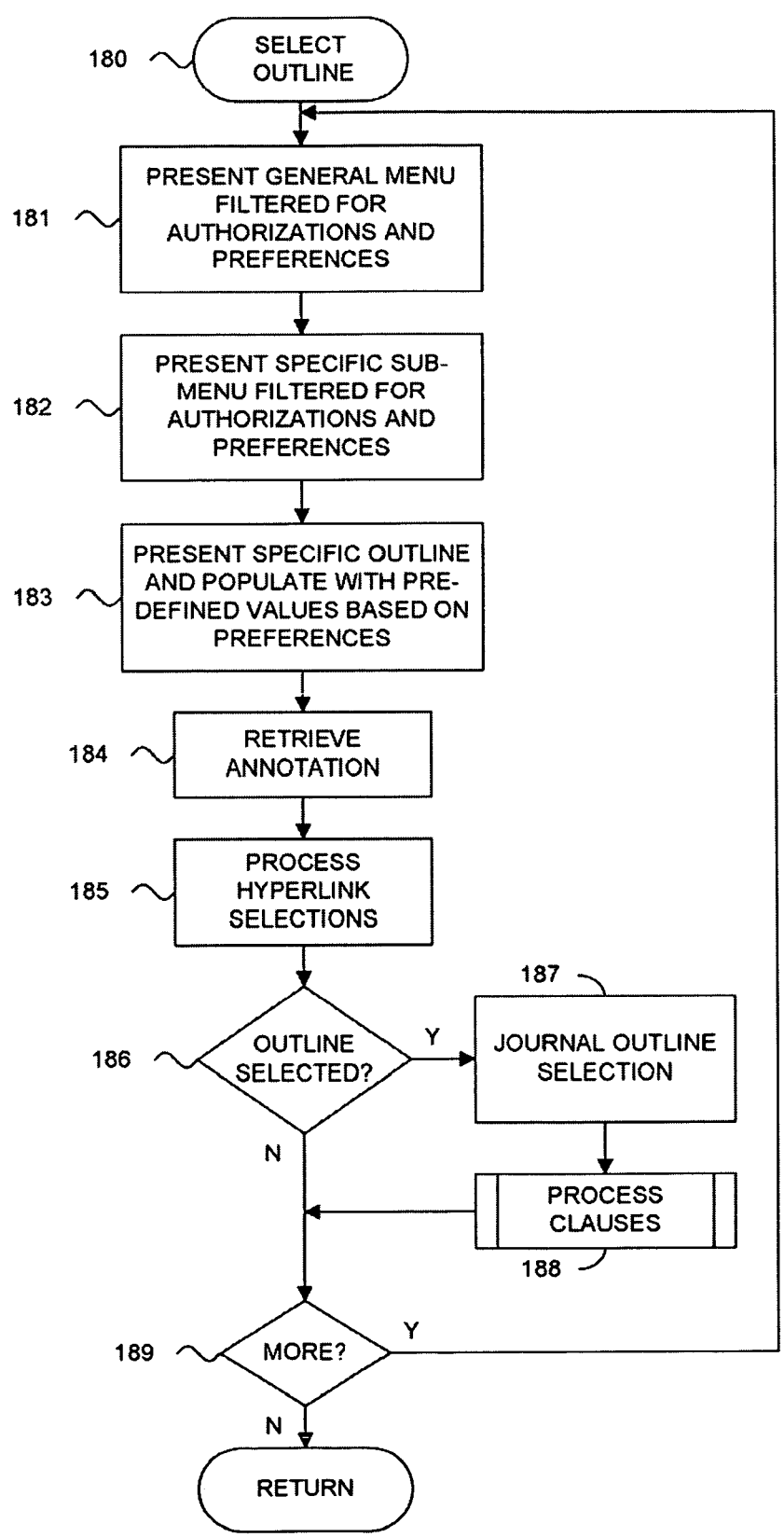
FIG. 10 is a flow diagram showing a routine for selecting a standard outline for use in the method of FIG. 8.

FIG. 10 is a flow diagram showing a routine for selecting a standard outline 180 for use in the method of FIG. 8. The purpose of this routine is to present a set of standard outline selection menus, standard outlines and annotations. As with clauses, using the indices 43, a general menu of outlines is presented (block 181), filtered based on the authorizations list 46 for the user and populated with values based on the preferences 128 for the given user and the potentially affected parties. The authorizations list 46 and preferences 128 can optionally include pricing information which further filter the general clauses menu. Upon user input, a specific submenu of particular outline types, using the indices 43, is presented (block 182), again filtered based on authorizations list 46 and preferences 128 and any optional pricing information. Upon user input, a outline is retrieved from the outline table 40 and presented (block 183). The outline is populated with pre-defined values, such as names of potentially affected parties and similar information, based on the preferences 128 and any optional pricing information. If associated, an annotation is retrieved from the annotations 42 (block 184) and any hyperlink selections are processed (block 185). If the outline is selected for use in the actual complex document (block 186), the outline selection is recorded in the journal 45 (block 187) and clause selections are processed (block 188), as further described below with reference to FIG. 13. Outline selection continues until no further outlines are selected (block 189), after which the routine returns.

Figure 11:
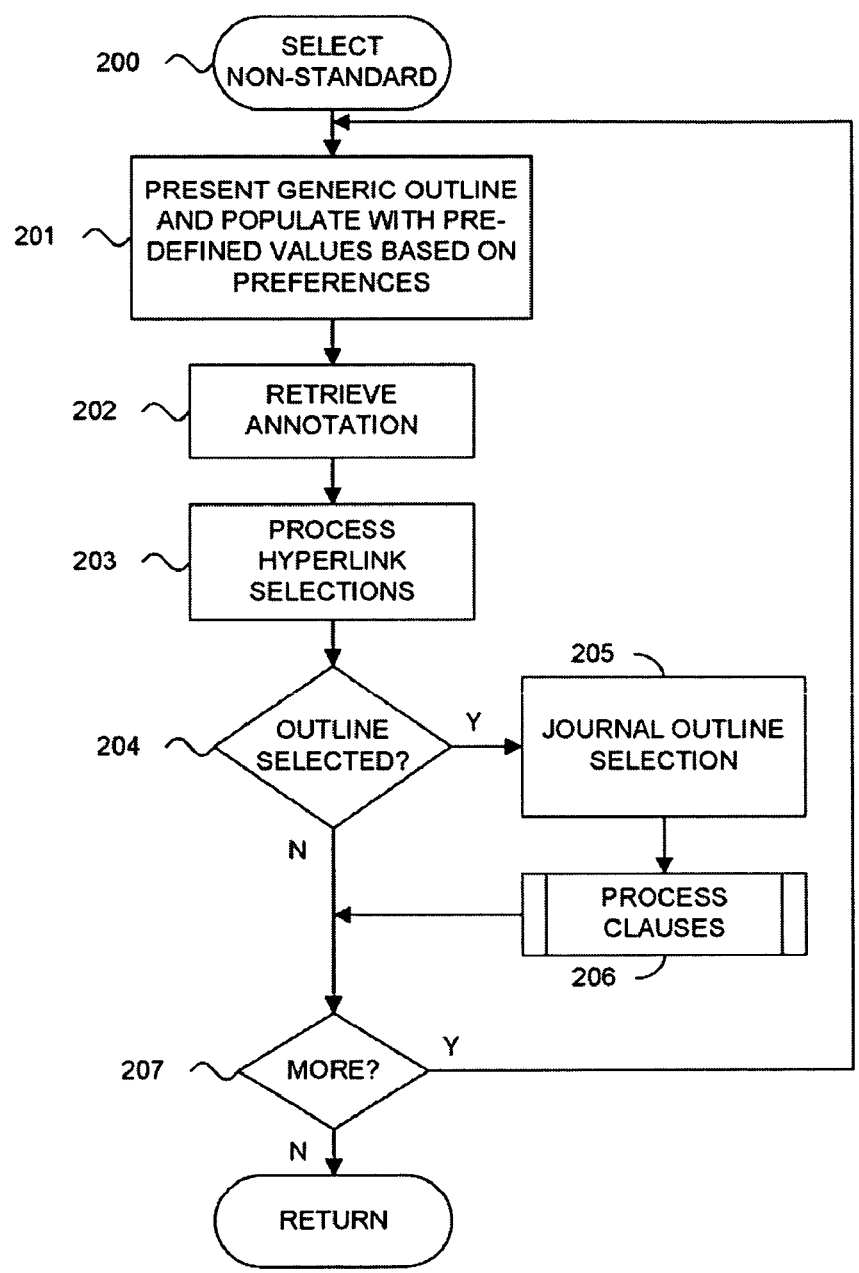
FIG. 11 is a flow diagram showing a routine for selecting a non-standard outline for use in the method of FIG. 8.

FIG. 11 is a flow diagram showing a routine for selecting a non-standard outline 200 for use in the method of FIG. 8. The purpose of this routine is to present a set of non-standard outline selection menus, non-standard outlines and annotations. The primary difference between selections of standard versus non-standard outlines is the use of the preferences 128 and specific types of outlines in standard outline selections. Non-standard outline selection is free format and primarily consists of a bare skeleton outline that can be populated with clauses in an unstructured fashion. Using the indices 43, a general menu of non-standard outlines is presented (block 201), filtered based on authorizations list 46 which can optionally include pricing information. If associated, an annotation is retrieved from the annotations 42 (block 202) and any hyperlink selections are processed (block 203). If the outline is selected for use in the actual complex document (block 204), the outline selection is recorded in the journal 45 (block 215) and clause selections are processed (block 216), as further described below with reference to FIG. 13. Non-standard outline selection continues until no further outlines are selected (block 217), after which the routine returns.

Figure 12:
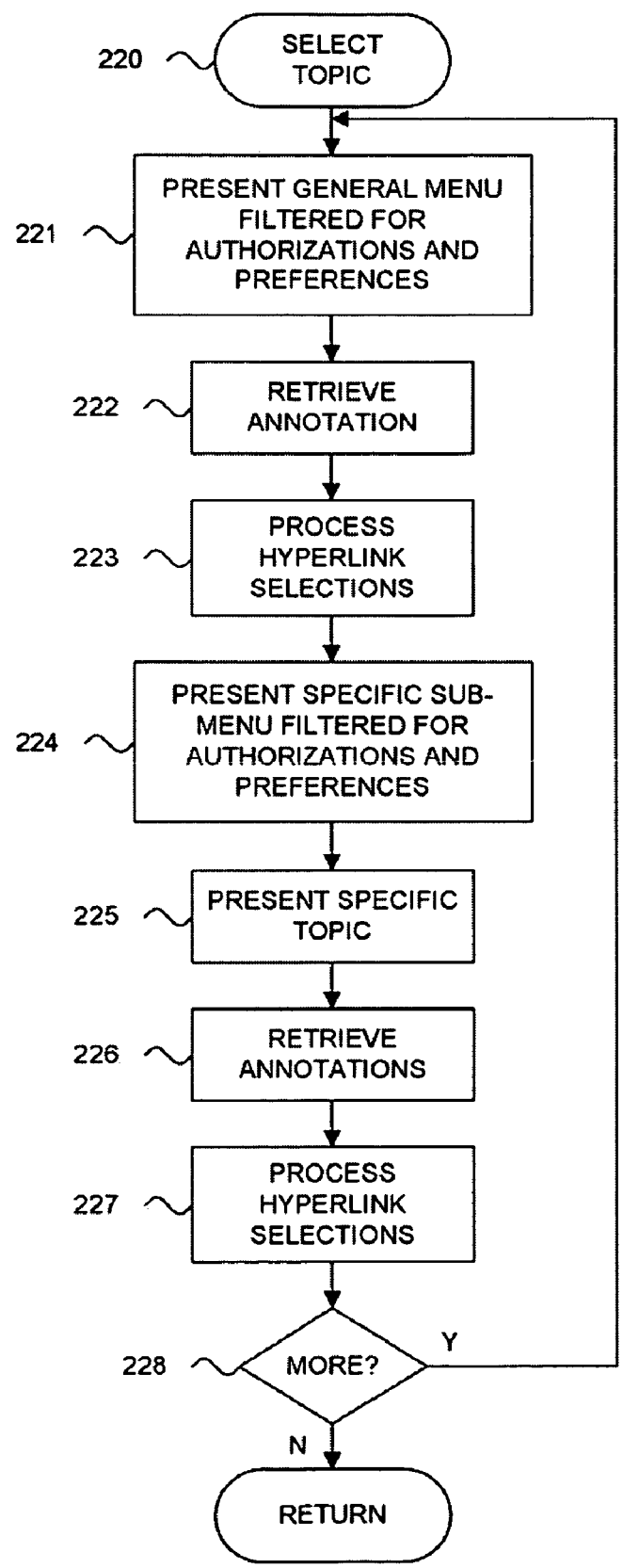
FIG. 12 is a flow diagram showing a routine for selecting a topic for use in the method of FIG. 8.

FIG. 12 is a flow diagram showing a routine for selecting a topic for use in the method of FIG. 8. The purpose of this routine is to present information relating to some aspect of complex document drafting. Using the indices 43, a general menu of topics is presented (block 221), filtered based on the authorizations list 46 for the user and populated with values based on the preferences 128 for the given user and the potentially affected parties and any optional pricing information. If associated, an annotation is retrieved from the annotations 42 (block 222) and any hyperlink selections are processed (block 223). Upon user input, a specific submenu of particular topic types, using the indices 43, is presented (block 224), again filtered based on authorizations list 46 and preferences 128, including any optional pricing information. Upon user input, a specific topic is retrieved from the learn topics 44 and presented (block 225). If associated, an annotation is retrieved from the annotations 42 (block 226) and any hyperlink selections are processed (block 227). Topic selection continues until no further topics are selected (block 228), after which the routine returns.

Figure 13:
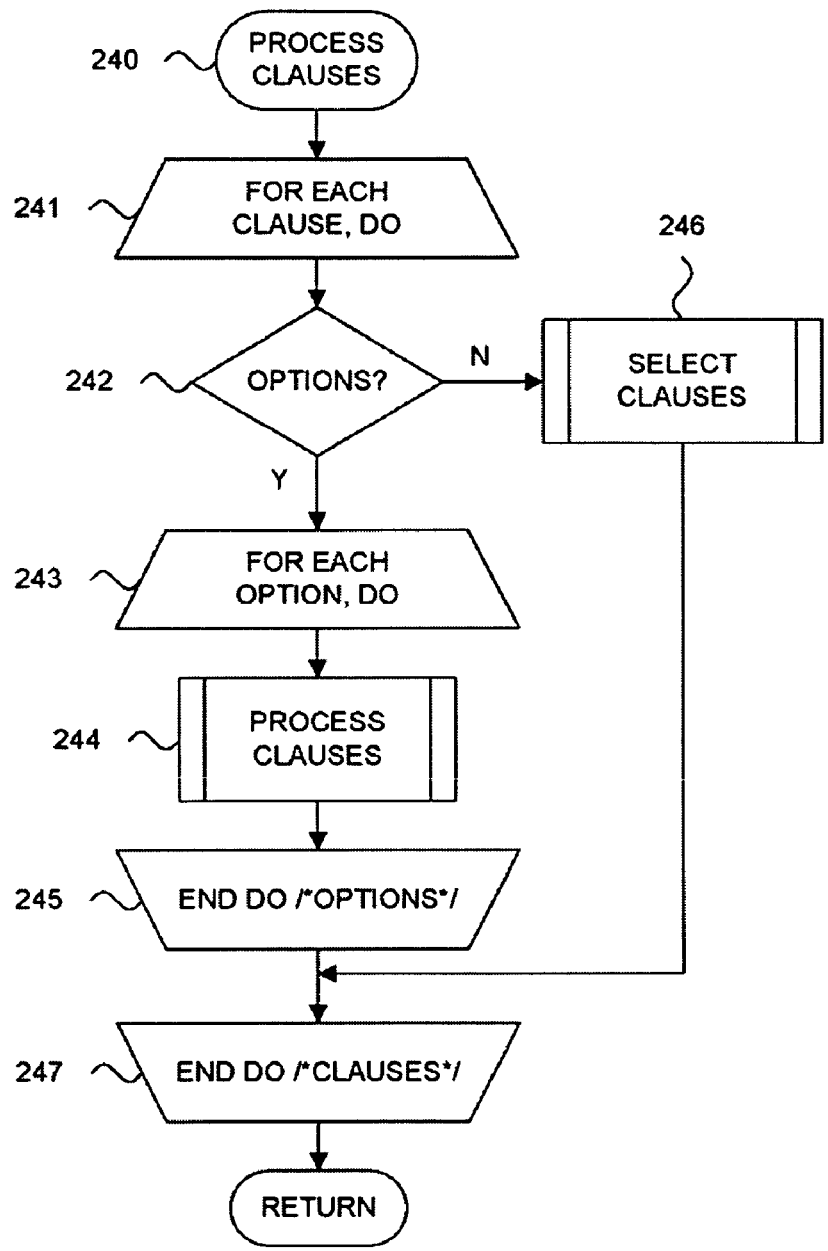
FIG. 13 is a flow diagram showing a routine for processing clauses for use in the routines of FIGS. 10 and 11.

FIG. 13 is a flow diagram showing a routine for processing clauses 240 for use in the routines of FIGS. 10 and 11. The purpose of this routine is to populate an outline with clauses. The routine consists of a pair of nested iterative loops. During each iteration of the outer iterative loop (blocks 241-247), individual clauses are selected (block 246) or sets of clause options are processed (blocks 243-245). During each iteration of the inner iterative loop (blocks 243-245), clause options sets are processed (block 244). Other forms of flow control could be used in lieu of iterative loops and recursion.

For each clause specified in an outline (block 241), if the clause does not include a set of optional clauses (block 242), individual clauses are selected (block 246), as further described above with reference to FIG. 9. Otherwise, for each option (block 243), the clause is processed by recursively invoking the present routine (block 244). Iterative processing of options continues until all options have been processed (block 245). Similarly, iterative processing of clauses continues until all clauses have been processed (block 247), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for complex document drafting using an authenticated outline table, comprising:
   a database maintaining a collection of outlines, each outline comprising an organizational framework of clauses;
   a storage device maintaining user authorization lists and preference lists;
   a filter module, comprising:
      an identification module receiving identification information from a user;
      a list module selecting one of the user authorization lists and one of the preference lists from the storage device based on the identification information received;
      an authorization comparison module comparing the outlines to the user authorization list and filtering those outlines from use for which the user is not authorized in the authorization list;
      a preference comparison module comparing the outlines to the preference list and filtering those outlines from use that are not preferred by the user in the preference list;
      a display module displaying the non-filtered outlines to the user;
   an outline selection module selecting at least one of the non-filtered outlines based on a request from the user;
   a document module providing the selected non-filtered outline to the user in a document;
   a clause table comprising a plurality of clauses;
   a clause authorization module comparing the clauses to the user authorization list and filtering those clauses from use in the document for which the user is not authorized;
   a clause preference module comparing the clauses to the preference list and filtering those clauses from use in the document that are not preferred by the user;
   a display displaying the non-filtered clauses to the user;
   a clause selection module selecting one or more of the non-filtered clauses based on a clause request; and
   a clause insertion module inserting the selected non-filtered clauses into the selected non-filtered outline in the document; and
   a processor executing the modules.

2. The computer-implemented system according to claim 1, further comprising:
   a journal module recording the selected non-filtered outline in a journal.

3. The computer-implemented system according to claim 1, wherein the outlines comprise at least one of structured order outlines and free format outlines.

4. The computer-implemented system according to claim 1, wherein one or more of the clauses each include fields into which a third party is inserted.

5. The computer-implemented system according to claim 1, further comprising:
   an annotation module associating at least one annotation with each of the outlines stored in the database and displaying the associated annotation with the selected non-filtered outline.

6. The computer-implemented system according to claim 5, wherein each annotation comprises one or more hyperlinks to references for the selected non-filtered outline.

7. The computer-implemented system according to claim 1, further comprising:
   a topic module associating one or more topics with each of the outlines in the database and displaying the associated topics with the selected non-filtered outline, wherein the topics each comprise at least one of educational and reference data.

8. The computer-implemented system according to claim 1, wherein at least one of the user authorization list and the preference list further comprises pricing information.

9. The computer-implemented system according to claim 8, the computer-implemented system further comprising:
   a price filter module filtering the outlines based on the pricing information.

10. The computer-implemented system according to claim 1, further comprising:
    a search module conducting a search for the selected non-filtered outline based on a search request from the user.

11. A computer-implemented method for complex document drafting using an authenticated outline table, comprising:
    maintaining a collection of user authorization lists, preference lists, and outlines, each outline comprising an organizational framework of clauses;
    receiving identification information from a user;
    selecting one of the user authorization lists and one of the preference lists based on the identification information received;
    comparing the outlines to the user authorization list and filtering those outlines from use for which the user is not authorized in the authorization list;
    comparing the outlines to the preference list and filtering those outlines from use that are not preferred by the user in the preference list;
    displaying the non-filtered outlines to the user and selecting at least one of the non-filtered outlines based on a request from the user;
    providing the selected non-filtered outline to the user in a document;
    maintaining a clause table comprising a plurality of clauses;
    comparing the clauses to the user authorization list and filtering those clauses from use in the document for which the user is not authorized;
    comparing the clauses to the preference list and filtering those clauses from use in the document that are not preferred by the user;

displaying the non-filtered clauses to the user;

selecting one or more of the non-filtered clauses based on a clause request;

inserting the selected non-filtered clauses into the selected non-filtered outline in the document.

12. The computer-implemented method according to claim 11, further comprising:

recording the selected non-filtered outline in a journal.

13. The computer-implemented method according to claim 11, wherein the outlines comprise at least one of structured order outlines and free format outlines.

14. The computer-implemented method according to claim 11, wherein one or more of the clauses each include fields into which a third party is inserted.

15. The computer-implemented method according to claim 11, further comprising:

associating at least one annotation with each of the outlines stored in the database; and displaying the associated annotation with the selected non-filtered outline.

16. The computer-implemented method according to claim 15, wherein each annotation comprises one or more hyperlinks to references for the selected non-filtered outline.

17. The computer-implemented method according to claim 11, further comprising:

associating one or more topics with each of the outlines in the database, wherein the topics each comprise at least one of educational and reference data; and displaying the associated topics with the selected non-filtered outline.

18. The computer-implemented method according to claim 11, wherein at least one of the user authorization list and the preference list further comprises pricing information.

19. The computer-implemented method according to claim 18, further comprising:

filtering the outlines based on the pricing information.

20. The computer-implemented method according to claim 11, further comprising:

conducting a search for the selected non-filtered outline based on a search request from the user.

* * * * *